(12) United States Patent
Hecht

(10) Patent No.: US 8,529,166 B2
(45) Date of Patent: Sep. 10, 2013

(54) CUTTING TOOL AND CUTTING INSERT THEREFOR

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 384 days.

(21) Appl. No.: 12/938,153

(22) Filed: Nov. 2, 2010

(65) Prior Publication Data

US 2011/0110733 A1 May 12, 2011

(30) Foreign Application Priority Data

Nov. 10, 2009 (IL) .......................................... 202026

(51) Int. Cl.
*B23B 27/04* (2006.01)

(52) U.S. Cl.
USPC .......................................... 407/103; 407/113

(58) Field of Classification Search
CPC ................................ B23B 27/16; B23B 27/04
USPC ............................ 407/103, 104, 106, 48, 113
See application file for complete search history.

(56) References Cited

U.S. PATENT DOCUMENTS

| | | | |
|---|---|---|---|
| 3,629,919 A * | 12/1971 | Trevarrow, Jr. ............... | 407/103 |
| 5,931,613 A | 8/1999 | Larsson | |
| 6,413,021 B1 * | 7/2002 | Koch et al. ..................... | 407/43 |
| 7,094,006 B2 | 8/2006 | Hecht | |
| 7,407,348 B2 * | 8/2008 | Sjogren et al. ................ | 407/119 |
| 2007/0248425 A1 | 10/2007 | Andersson et al. | |
| 2008/0166191 A1 | 7/2008 | Andersson et al. | |

FOREIGN PATENT DOCUMENTS

| | | | |
|---|---|---|---|
| DE | 20 2005 016 610 | | 1/2006 |
| EP | 1375037 A1 | * | 2/2004 |
| EP | 1 657 012 | | 5/2006 |
| JP | 57189718 | * | 11/1982 |
| JP | 2007-168005 | * | 7/2007 |
| JP | 2008-155366 | * | 7/2008 |
| JP | 2009-226546 | * | 10/2009 |

OTHER PUBLICATIONS

International Search Report in PCT/IL2010/000846, dated Feb. 23, 2011.

* cited by examiner

*Primary Examiner* — Daniel Howell
*Assistant Examiner* — Ryan Rufo
(74) *Attorney, Agent, or Firm* — Womble Carlyle

(57) ABSTRACT

An indexable cutting insert has opposing side surfaces and two cutting portions, one of which is operative when the cutting insert is retained in an insert holder. An insert bore opens out to both side surfaces. Two major abutment surfaces located on opposite sides of the insert bore extend from one of the side surfaces, one major abutment surface being closer to the operative cutting portion than the other. Two minor abutment surfaces extend from the same side surface. In a plan view of the side surface, the minor abutment surfaces are transverse to the two major abutment surfaces and also to base abutment surfaces associated with the major and minor abutment surfaces.

20 Claims, 3 Drawing Sheets

CUTTING TOOL AND CUTTING INSERT THEREFOR

FIELD OF THE INVENTION

The present invention relates to metal cutting tools for grooving, parting and turning having a cutting insert releasably secured therein via a screw.

BACKGROUND OF THE INVENTION

U.S. Pat. No. 7,094,006 discloses a cutting tool in which the cutting insert has two abutment surfaces transverse to two side surfaces and the insert pocket has two sidewalls transverse to the base wall. When the cutting insert is retained in the insert pocket a first abutment surface abuts a first sidewall of the insert pocket, a second abutment surfaces abuts a second sidewall of the insert pocket and a side surface of the cutting insert abuts the base wall of the insert pocket. The first sidewall is elongated in form, extending longitudinally rearwardly from a forward end of the cutting tool. The first side wall is located on a lower support member in the form of a relatively thin narrow strip of the tool body.

Insert securing methods that do not require a lower support member of the type described above use specially designed protrusions (or recesses) extending from the tool shank, abutting matching recesses (protrusions) in the base of the cutting insert, as described, for example, in DE022005016610U1 and EP1657012. EP1657012 discloses a securing method with an elevated boss having studs oriented around the screw bore in a double-Y formation. While the insert is in a secured position, the boss and studs of the cutting insert abut matching recesses in the insert pocket. The abutment surfaces described in DE022005016610U1 and EP1657012 have a non-parallel orientation with respect to a screw bore axis. This allows for machining forces exerted onto the cutting insert and eventually the abutment surfaces, to have an element in the direction of the screw bore axis. Swiss-type automatic machines are known to require the use of small cutting tools secured with high accuracy in the machine. In this field, cutting edge location accuracy is attained either by an accurate abutment (which is most likely achieved by a rather expensive grinding of the abutment surfaces) or by grinding the cutting portion. Achieving an accurate abutment is somewhat difficult when the abutment surfaces are created by form-pressing and sintering (without grinding) as disclosed, for example, in DE022005016610U1.

SUMMARY OF THE INVENTION

In accordance with the present invention there is provided an indexable cutting insert comprising:
first and second side surfaces and a peripheral surface (22) extending therebetween;
two cutting portions located at opposite ends of the cutting insert;
an insert bore opening out to both side surfaces, the insert bore having an insert bore axis S about which the cutting insert has 180° rotational symmetry;
two major abutment surfaces extending from the second side surface and located on opposite sides of the insert bore, each major abutment surface being closer to one cutting portion than to the other cutting portion;
first and second minor abutment surfaces extending from the second side surface, wherein in a plan view of the second side surface the first and second minor abutment surfaces are transverse to the two major abutment surfaces; and
two base abutment surfaces distanced from the second side surface and facing away therefrom, each base abutment surface associated with one major abutment surface and one minor abutment surface; wherein:
the abutment surfaces are organized into first and second sets of insert abutment surfaces having overlapping membership, only one set capable of being operative at a given time, the first set comprising the two base abutment surfaces, the two major abutment surfaces and the first minor abutment surface, the second set comprising the two base abutment surfaces, the two major abutment surfaces and the second minor abutment surface.

In accordance with some embodiments, the base abutment surfaces are parallel to the second side surface.

In accordance with some embodiments, the major and minor abutment surfaces are planar.

In accordance with some embodiments, the major and minor abutment surfaces are perpendicular to the second side surface.

In accordance with some embodiments, in a plan view of the second side surface the major abutment surfaces are parallel to one another and to an insert longitudinal axis A1 of the cutting insert, the insert longitudinal axis A1 passing through the insert bore axis S and through the cutting portions.

In accordance with some embodiments, the major abutment surfaces face in opposite directions.

In accordance with some embodiments, the cutting insert further comprises two support beams protruding from the second side surface, each support beam having formed thereon one base abutment surface, one major abutment surface, and one minor abutment surface.

In accordance with the present invention, there is also provided a cutting tool comprising: an insert holder having a forward end and comprising: an insert pocket at the forward end, a shank extending rearwardly from the insert pocket and first and second holder surfaces extending rearwardly from the forward end; and an indexable cutting insert retained in the insert pocket.

In accordance with some embodiments, the insert pocket comprises:
a base surface located between the second holder surface and an imaginary plane M passing through the first holder surface;
a pocket bore opening out to the base surface;
first and second major support surfaces extending from the base surface and located on opposite sides of the pocket bore, the first major support surface being closer to the forward end than the second major support surface; and
a minor support surface extending from the base surface and located further from the forward end of the insert holder than the first major support surface, the minor support surface being transverse to the first and second major support surfaces;

In accordance with some embodiments, the base surface, the first and second major support surfaces and the minor support surface are planar.

In accordance with some embodiments, the first and second major support surfaces and the minor support surface are perpendicular to the base surface.

In accordance with some embodiments, the pocket bore has a pocket bore axis P and wherein in a plan view of the base surface the first and second major support surfaces are parallel to one another and are parallel to and located on either side of a holder longitudinal axis A2, the holder longitudinal axis A2 passing through the pocket bore axis P and through the shank.

In accordance with some embodiments, the first and second major support surfaces face in opposite directions.

In accordance with some embodiments, the first and second major support surfaces are located on a longitudinal projection protruding from the base surface.

In accordance with some embodiments, the base surface comprises an upper base support surface on one side of the longitudinal projection; and a lower base support surface on an opposite side of the longitudinal projection.

In accordance with some embodiments, only the upper base support surface, the lower base support surface, the first and second major support surfaces and the minor support surface are configured to support abutment surfaces formed on a cutting insert.

In accordance with some embodiments, the cutting insert has first and second support beams protruding from the second side surface, each support beam having formed thereon one base abutment surface, one major abutment surface, and one minor abutment surface;

the two base abutment surfaces abut the base surface of the insert holder;

a first of the two major abutment surfaces abuts the first major support surface;

a second of the two major abutment surfaces abuts the second major support surface; and one of the minor abutment surfaces abuts the minor support surface.

In accordance with the present invention, there is also provided an insert holder having a forward end and comprising:

an insert pocket at the forward end, a shank extending rearwardly from the insert pocket and first and second holder surfaces extending rearwardly from the forward end;

wherein the insert pocket comprises:

a base surface located between the second holder surface and an imaginary plane M passing through the first holder surface;

a pocket bore opening out to the base surface;

first and second major support surfaces extending from the base surface and located on opposite sides of the pocket bore, the first major support surface being closer to the forward end than the second major support surface; and a minor support surface extending from the base surface and located further from the forward end than the first major support surface, the minor support surface being transverse to the first and second major support surfaces.

BRIEF DESCRIPTION OF THE DRAWINGS

For a better understanding of the present invention and to show how the same may be carried out in practice, reference will now be made to the accompanying drawings, in which.

Figure 1:
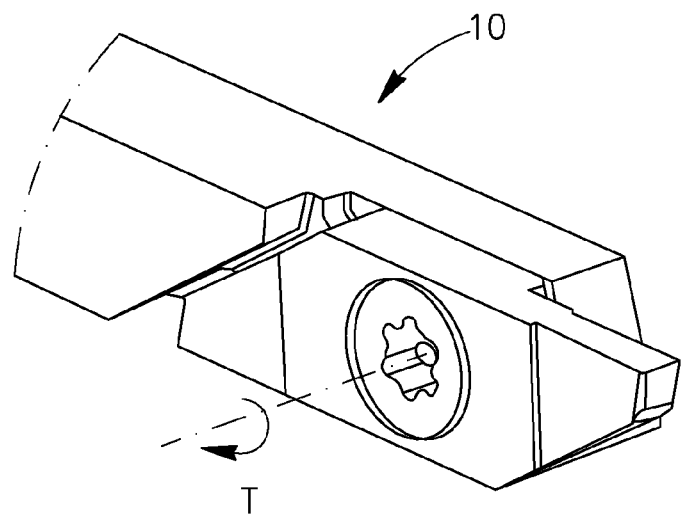
FIG. 1 is an isometric view of an assembled cutting tool according to embodiments of the present invention.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Figure 2:
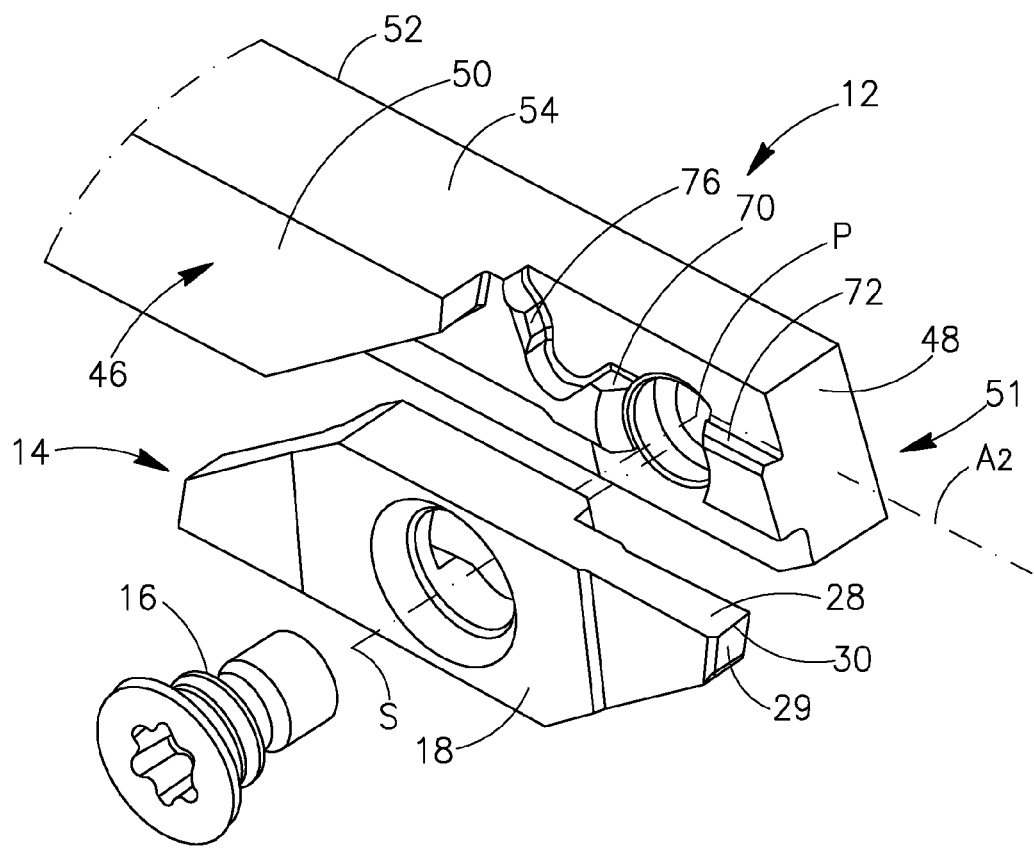
FIG. 2 is an isometric exploded view of the cutting tool of FIG. 1.

Reference is made to FIGS. 1 and 2 showing, respectively, an isometric view and an isometric exploded view of a cutting tool 10 in accordance with embodiments of the invention. The cutting tool 10 includes an insert holder 12 and an indexable cutting insert 14 releasably retainable in the insert holder 12 by a screw 16.

The cutting insert is typically made of extremely hard and wear-resistant material such as cemented carbide, either by form-pressing or by injection molding and sintering carbide powders in a binder. The cemented carbide may be, for example, tungsten carbide. The cutting insert may be coated or uncoated.

Figure 3:
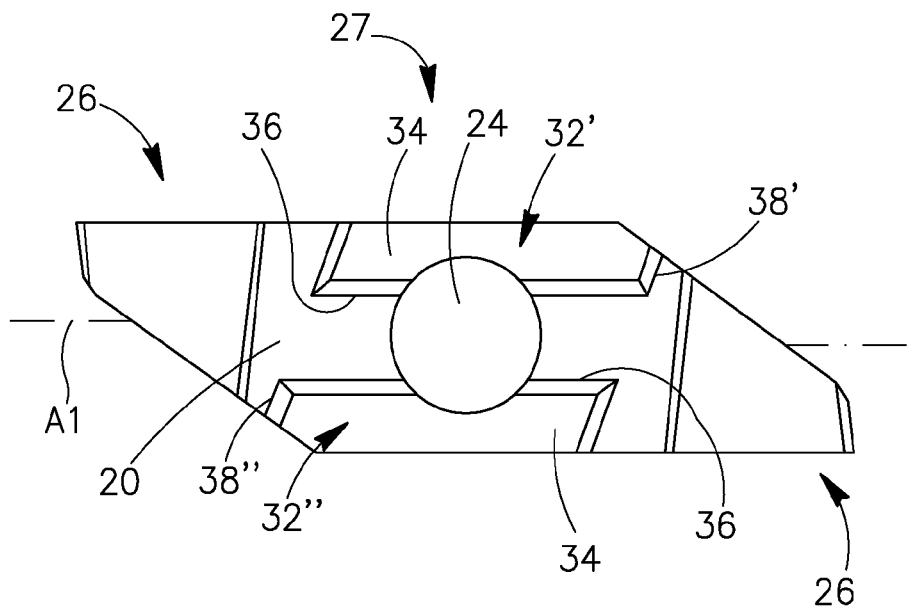
FIG. 3 is a side view of the cutting insert shown in FIG. 1.
Figure 4:
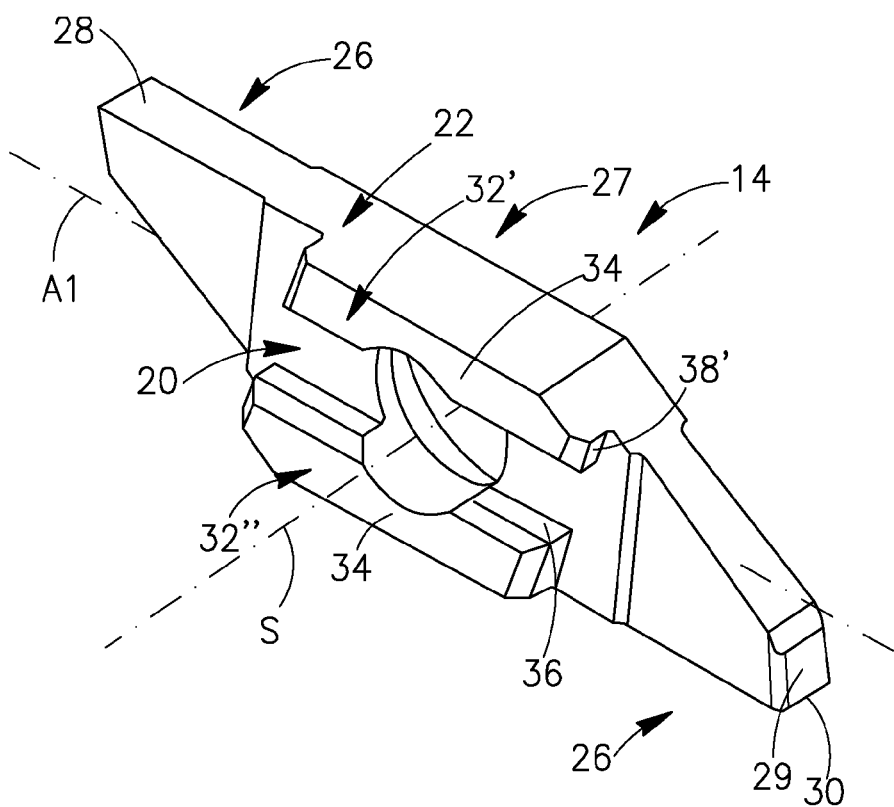
FIG. 4 is an isometric view of the cutting insert of FIG. 3.

Reference is further made to FIGS. 2, 3 and 4 showing the cutting insert 14 in isometric and side views. The cutting insert 14 has generally parallel first and second side surfaces 18, 20 and a peripheral surface 22 extending therebetween. The cutting insert 14 has an insert bore 24 opening out to the first and second side surfaces 18, 20 and an insert bore axis S about which the cutting insert has a 180° rotational symmetry. The insert bore axis S being perpendicular to the first and second side surfaces 18, 20. The cutting insert 14 has two cutting portions 26 at opposite ends thereof and a clamping portion 27 located between the cutting portions 26. The cutting insert has an insert longitudinal axis A1 passing through the cutting portions 26 and the insert bore axis S. Each cutting portion 26 has a rake surface 28 and a relief surface 29 which meet at a cutting edge 30. The clamping portion 27 may have, according to embodiments of the invention, first and second support beams 32', 32" protruding from the second side surface 20 and located on each side of the pocket bore. Each support beam 32', 32" has a base abutment surface 34 which according to some embodiments may be parallel to the second side surface 20. Each support beam 32', 32" has a major abutment surface 36 and at least one respective minor abutment surface 38', 38", each of which is transverse to the associated major abutment surface 36. According to some embodiments, the major and minor abutment surfaces 36, 38', 38" are planar and perpendicular to the second side surface 20. According to some embodiments of the invention, the major abutment surfaces 36 are parallel one to another and face in opposite directions.

Figure 5:
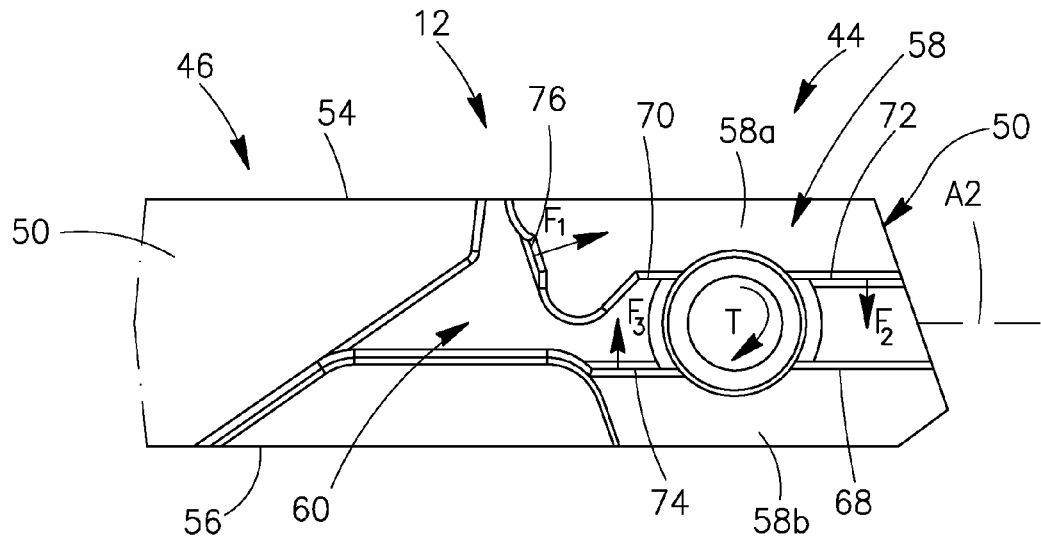
FIG. 5 is a side view of the shank shown in FIG. 1.
Figure 6:
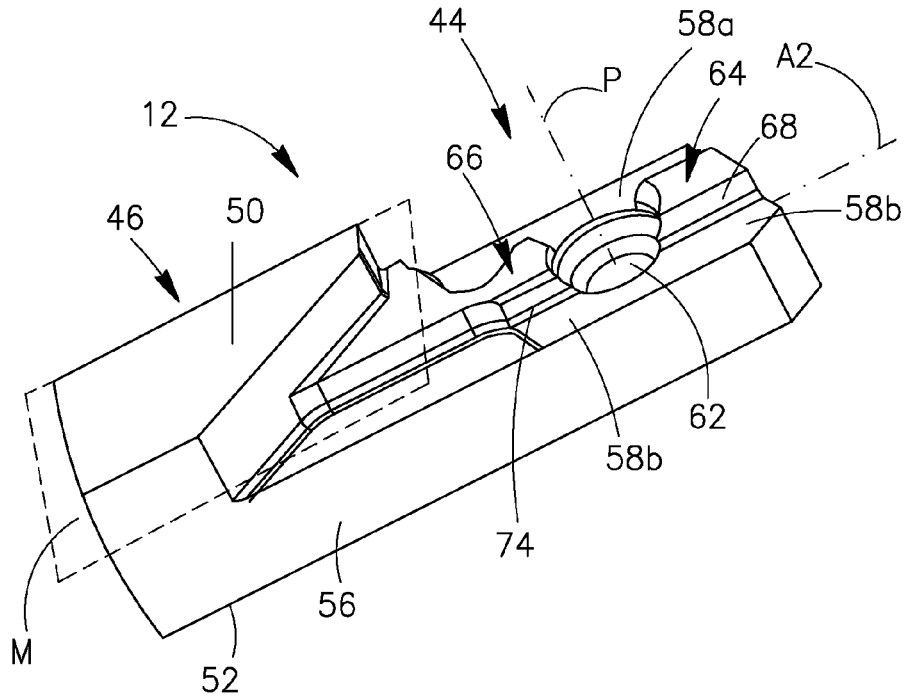
FIG. 6 is an isometric view of the shank of FIG. 5.

Reference is made to FIGS. 5 and 6 showing the insert holder 12 in respective side and isometric views. The insert holder 12 has an insert pocket 44 adjacent a forward end 51 and a shank 46 extending rearwardly from the insert pocket 44. The insert holder 12 has a front holder surface 48 at the forward end 51 of the insert holder 12 with opposing first and second holder surfaces 50, 52 and opposing upper and lower holder surfaces 54, 56 extending rearwardly from the front holder surface 48. The insert holder has a holder longitudinal axis A2 defining a front-to-rear direction of the insert holder and passing through the shank 46 and the pocket bore axis P. In accordance with some embodiments, the upper and lower holder surfaces 54, 56 are perpendicular to the first and second holder surfaces 50, 52, respectively.

The insert pocket 44 opens out to the upper and lower holder surfaces 54, 56 and to the first and front holder surfaces 50, 48. The insert pocket 44 includes a base surface 58, a longitudinal projection 60 and a pocket bore 62 having a pocket bore axis P and opening out to the base surface 58. According to some embodiments, the base surface 58 is planar and parallel to the first and second holder surfaces 50, 52. The base surface 58 is located between the second holder surface 52 and an imaginary plane M passing through the first holder surface 50. The base surface 58 may comprise an upper base support surface 58$a$ on one side of the longitudinal projection 60 and adjacent the upper holder surface 54, and a lower base support surface 58$b$ on the opposite side of the longitudinal projection 60 and adjacent the lower holder surface 56.

The longitudinal projection 60 projects from the base surface 58 and extends rearwardly from a front end of the insert pocket 44. According to some embodiments, the pocket bore 62 divides the longitudinal projection 60 into front and rear projections 64, 66. The front and rear projections 64, 66 have front and rear projection surfaces 68, 70 respectively. The front and rear projections 64, 66 have first and second major support surfaces 72, 74 respectively, with the first (or front) major support surface 72 being closer to the forward end 51 than the second (or rear) major support surface 74. In accordance with embodiments of the invention, the rear projection 64 has a minor support surface 76, located rearward and upward of the pocket bore axis P in a plan view of the base surface 58. According to some embodiments, the first and second major support surfaces 72, 74 are parallel to each other, face opposite directions and are transverse to the minor support surface 76. The first and second major support surfaces 72, 74 and the minor support surface 76 may be perpendicular to the base surface 58.

When the cutting insert 14 is in a securely retained position in the insert pocket 44 (see FIG. 1) with the screw 16 located in the insert bore 24 and threadingly received in the pocket bore 62, the two base abutment surfaces 34 of the cutting insert 14 abut the base surface 58 of the insert holder 12 at the upper and lower base support surfaces 58$a$, 58$b$, one of the minor abutment surfaces 38 abuts the minor support surface 76, the major abutment surface 36 of the first support beam 32' abuts the first major support surface 72 on the front projection 64, and the major abutment surface 36 of the second support beam 32" abuts the second major support surface 74 on the rear projection 66.

In accordance with some embodiments of the present invention, when the cutting insert 14 is securely retained in the insert pocket 44 the front and rear projection surfaces 68, 70 are not abutted by any surface of the cutting insert 14.

It can thus be seen that the embodiment shown, on the cutting insert, the abutment surfaces 34, 36, 38', 38" are organized into first and second sets of insert abutment surfaces having overlapping membership, only one set capable of being operative at a given time. A first set of insert abutment surfaces comprises the two base abutment surfaces 34, the two major abutment surfaces 36 and a first minor abutment surface 38'. A second set of insert abutment surfaces comprises the two base abutment surfaces 34, the two major abutment surfaces 36 and the second minor abutment surface 38". Meanwhile, the insert holder 12 has a single set of holder support surfaces which comprises the base surface 58 (which may include separate upper and lower base support surfaces 58$a$, 58$b$), the first major support surface 72, the second major support surface 74 and the minor support surface 76.

Another position of the cutting insert 14, referred to herein as a seated position, is when the cutting insert 14 is seated in the insert pocket 44 and the screw 16 is located in the insert bore 24, partially threaded in the pocket bore 62, but not tightened. In the seated position, the pocket bore 62 and the insert bore 24 are eccentric in the forward to rearward direction. When the screw 16 is tightened, the cutting insert 14 is forced rearwardly, causing the minor abutment surface 38 to slide over the minor support surface 76 until they reach full abutment. The tightening of the screw 16 gives rise to a locking force F1 perpendicular to the minor support surface 76 (shown illustratively in FIG. 5). Since the minor support surface 76 is transverse to the first and second major support surfaces 72, 74 the locking force F1 generates a clockwise directed torque T (see FIGS. 1 and 5) on the cutting insert 14 with respect to the insert bore axis S, which rotates the cutting insert 14 in the clockwise direction. The torque T generates, in turn, perpendicular abutment forces F2 and F3 on the first and second major support surfaces 72, 74 respectively (shown illustratively in FIG. 5). Cutting forces applied to the cutting insert 14 operate to enhance the forces F2 and F3 thereby increasing the locking of the cutting insert 14 in the insert pocket 44. Consequently, according to some embodiments, the cutting forces do not weaken the screw 16. In other words, even when cutting forces are applied to the cutting insert 14, the screw 16 is not submitted to additional forces, other than locking, or shear forces generated by the tightening of the screw 16.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. An indexable cutting insert (14) comprising:
   first and second side surfaces (18, 20) and a peripheral surface (22) extending therebetween;
   two cutting portions (26) located at opposite ends of the cutting insert (14);
   an insert bore (24) opening out to both side surfaces (18, 20), the insert bore (24) having an insert bore axis S about which the cutting insert (14) has 180° rotational symmetry;
   two major abutment surfaces (36) extending from the second side surface (20) and located on opposite sides of the insert bore (24), each major abutment surface being closer to one cutting portion than to the other cutting portion;
   first and second minor abutment surfaces (38', 38") extending from the second side surface (20), wherein in a plan view of the second side surface (20) the first and second minor abutment surfaces (38', 38") are transverse to the two major abutment surfaces (36); and
   two base abutment surfaces (34) distanced from the second side surface (20) and facing away therefrom, each base abutment surface (34) associated with one major abutment surface (36) and one minor abutment surface (38', 38"); wherein:
   the abutment surfaces (34, 36, 38', 38") are organized into first and second sets of insert abutment surfaces having overlapping membership, only one set capable of being operative at a given time, the first set comprising the two base abutment surfaces (34), the two major abutment surfaces (36) and the first minor abutment surface (38'), the second set comprising the two base abutment surfaces (34), the two major abutment surfaces (36) and the second minor abutment surface (38").

2. The cutting insert (14) according to claim 1, wherein the base abutment surfaces (34) are parallel to the second side surface (20).

3. The cutting insert (14) according to claim 1, wherein the major and minor abutment surfaces (36, 38', 38") are planar.

4. The cutting insert (14) according to claim 1, wherein the major and minor abutment surfaces (36, 38', 38") are perpendicular to the second side surface (20).

5. The cutting insert (14) according to claim 1, wherein in a plan view of the second side surface (20) the major abutment surfaces (36) are parallel to one another and to an insert longitudinal axis A1 of the cutting insert (14), the insert longitudinal axis A1 passing through the insert bore axis S and through the cutting portions (26).

6. The cutting insert (14) according to claim 1, wherein the major abutment surfaces (36) face in opposite directions.

7. The cutting insert (14) according to claim 1, further comprising two support beams (32', 32") protruding from the second side surface (20), each support beam having formed thereon one base abutment surface (34), one major abutment surface (36), and one minor abutment surface (38', 38").

8. A cutting tool comprising:
an insert holder (12) having a forward end (51) and comprising:
  an insert pocket (44) at the forward end (51), a shank (46) extending rearwardly from the insert pocket (44) and first and second holder surfaces (50, 52) extending rearwardly from the forward end (51); and
an indexable cutting insert (14) retained in the insert pocket (44), the indexable cutting insert comprising:
  first and second side surfaces (18, 20) and a peripheral surface (22) extending therebetween;
  two cutting portions (26) located at opposite ends of the cutting insert (14);
  an insert bore (24) opening out to both side surfaces (18, 20), the insert bore (24) having an insert bore axis S about which the cutting insert (14) has 180° rotational symmetry;
  two major abutment surfaces (36) extending from the second side surface (20) and located on opposite sides of the insert bore (24), each major abutment surface being closer to one cutting portion than to the other cutting portion;
  first and second minor abutment surfaces (38', 38") extending from the second side surface (20), wherein in a plan view of the second side surface (20) the first and second minor abutment surfaces (38', 38") are transverse to the two major abutment surfaces (36); and
  two base abutment surfaces (34) distanced from the second side surface (20) and facing away therefrom, each base abutment surface (34) associated with one major abutment surface (36) and one minor abutment surface (38', 38"); wherein:
    the abutment surfaces (34, 36, 38', 38") are organized into first and second sets of insert abutment surfaces having overlapping membership, only one set capable of being operative at a given time, the first set comprising the two base abutment surfaces (34), the two major abutment surfaces (36) and the first minor abutment surface (38'), the second set comprising the two base abutment surfaces (34), the two major abutment surfaces (36) and the second minor abutment surface (38").

9. The cutting tool according to claim 8, wherein the insert pocket (44) comprises:
  a base surface (58) located between the second holder surface (52) and an imaginary plane M passing through the first holder surface (50);
  a pocket bore (62) opening out to the base surface (58);
  first and second major support surfaces (72, 74) extending from the base surface (58) and located on opposite sides of the pocket bore (62), the first major support surface (72) being closer to the forward end (51) than the second major support surface (74); and
  a minor support surface (76) extending from the base surface (58) and located further from the forward end (51) than the first major support surface (72), the minor support surface (76) being transverse to the first and second major support surfaces (72, 74).

10. The cutting tool according to claim 9, wherein:
  the cutting insert (14) has first and second support beams (32', 32") protruding from the second side surface (20), each support beam having formed thereon one base abutment surface (34), one major abutment surface (36), and one minor abutment surface (38', 38");
  the two base abutment surfaces (34) abut the base surface (58) of the insert holder (12);
  a first of the two major abutment surfaces (36) abuts the first major support surface (72);
  a second of the two major abutment surfaces (36) abuts the second major support surface (74); and
  one of the minor abutment surfaces (38) abuts the minor support surface (76).

11. The cutting tool according to claim 9, wherein:
  the base surface (58) comprises an upper base support surface (58*a*) and a lower base support surface (58*b*);
  a first of the two base abutment surfaces (34) abuts the upper base support surface (58*a*); and
  a second of the two base abutment surfaces (34) abuts the lower base support surface (58*b*).

12. An insert holder (12) having a forward end (51) and comprising:
  an insert pocket (44) at the forward end (51), a shank (46) extending rearwardly from the insert pocket (44) and first and second holder surfaces (50, 52) extending rearwardly from the forward end (51);
  wherein the insert pocket (44) comprises:
    a base surface (58) located between the second holder surface (52) and an imaginary plane M passing through the first holder surface (50), wherein the base surface (58) comprises an upper base support surface (58*a*) and a lower base support surface (58*b*);
    a pocket bore (62) opening out to the base surface (58);
    first and second major support surfaces (72, 74) extending from the base surface (58) and located on opposite sides of the pocket bore (62), the first major support surface (72) being closer to the forward end (51) than the second major support surface (74); and
    a minor support surface (76) extending from the base surface (58) and located further from the forward end (51) than the first major support surface (72), the minor support surface (76) being transverse to the first and second major support surfaces (72, 74).

13. The insert holder (12) according to claim 12, wherein the base surface (58), the first and second major support surfaces (72, 74) and the minor support surface (76) are planar.

14. The insert holder (12) according to claim 12, wherein the first and second major support surfaces (72, 74) and the minor support surface (76) are perpendicular to the base surface (58).

15. The insert holder (12) according to claim 12, wherein:
the pocket bore (62) has a pocket bore axis P; and
in a plan view of the base surface (58), the first and second major support surfaces (72, 74) are parallel to one another and are parallel to and located on either side of a holder longitudinal axis A2, the holder longitudinal axis A2 passing through the pocket bore axis P and through the shank (46).

16. The insert holder (12) according to claim 12, wherein the first and second major support surfaces (72, 74) face in opposite directions.

17. The insert holder (12) according to claim 12, wherein:
the first and second major support surfaces (72, 74) are located on a longitudinal projection (60) protruding from the base surface (58).

18. The insert holder (12) according to claim 17, wherein the base surface (58) comprises:
the upper base support surface (58a) on one side of the longitudinal projection (60); and
the lower base support surface (58b) on an opposite side of the longitudinal projection (60).

19. The insert holder (12) according to claim 18, wherein only the upper base support surface (58a), the lower base support surface (58b), the first and second major support surfaces (72, 74) and the minor support surface (76) are configured to support abutment surfaces formed on a cutting insert, when a cutting insert is retained in the insert pocket (44).

20. An insert holder (12) having a forward end (51) and comprising:
an insert pocket (44) at the forward end (51), a shank (46) extending rearwardly from the insert pocket (44) and first and second holder surfaces (50, 52) extending rearwardly from the forward end (51);
wherein the insert pocket (44) comprises:
a base surface (58) located between the second holder surface (52) and an imaginary plane M passing through the first holder surface (50);
a pocket bore (62) opening out to the base surface (58);
first and second major support surfaces (72, 74) extending from the base surface (58) and located on opposite sides of the pocket bore (62), the first major support surface (72) being closer to the forward end (51) than the second major support surface (74); and
a minor support surface (76) extending from the base surface (58) and located further from the forward end (51) than the first major support surface (72), the minor support surface (76) being transverse to the first and second major support surfaces (72, 74), and wherein:
the first and second major support surfaces (72, 74) and the minor support surface (76) are perpendicular to the base surface (58).

* * * * *